United States Patent [19]

Spinner et al.

[11] 4,124,145

[45] Nov. 7, 1978

[54] DIVERTER VALVE ASSEMBLY AND PRIORITY CONTROL CIRCUIT FOR ICE DISTRIBUTION SYSTEMS

[75] Inventors: Joseph R. Spinner; Melvin A. Baker, both of Albert Lea, Minn.

[73] Assignee: King-Seeley Thermos Co., Ann Arbor, Mich.

[21] Appl. No.: 844,441

[22] Filed: Oct. 21, 1977

Related U.S. Application Data

[63] Continuation-in-part of Ser. No. 691,355, Jun. 1, 1976, Pat. No. 4,055,280.

[51] Int. Cl.² .............................................. F25C 5/18
[52] U.S. Cl. ....................................... 222/56; 62/344; 198/358; 214/16 R; 222/63; 222/64
[58] Field of Search .................. 222/52, 56, 23, 41, 222/63, 64, 76; 221/9, 10; 214/16 R; 198/358; 62/344

[56] References Cited

U.S. PATENT DOCUMENTS

| | | | |
|---|---|---|---|
| 2,298,829 | 10/1942 | McCann | 198/358 |
| 2,828,873 | 4/1958 | Arlin | 214/16 R |
| 3,010,160 | 11/1961 | Lytton et al. | 222/63 |
| 4,055,280 | 10/1977 | Kohl et al. | 62/344 X |

*Primary Examiner*—Joseph J. Rolla
*Attorney, Agent, or Firm*—Harness, Dickey & Pierce

[57] ABSTRACT

A diverter valve assembly and priority control circuit for use in an ice distribution system having an ice source and first and second ice delivery stations, the valve assembly comprising a valve body having an inlet section communicable with the ice source, and first and second outlet sections communicable with the first and second delivery stations, respectively; the valve assembly including a valve body having a central valve chamber communicable with the inlet and outlet sections and having a rotatable valve element disposed therein; an electrically energized motor for selectively rotating the valve element whereby to selectively communicate ice being supplied from the ice source to selected of the ice delivery stations, and a control system for use with the valve assembly, whereby to assure against actuation of the valve element during the delivery of ice to the valve assembly. An optional priority control circuit may also be included which is operative to direct ice to a selected delivery station before distribution to any other station.

11 Claims, 7 Drawing Figures

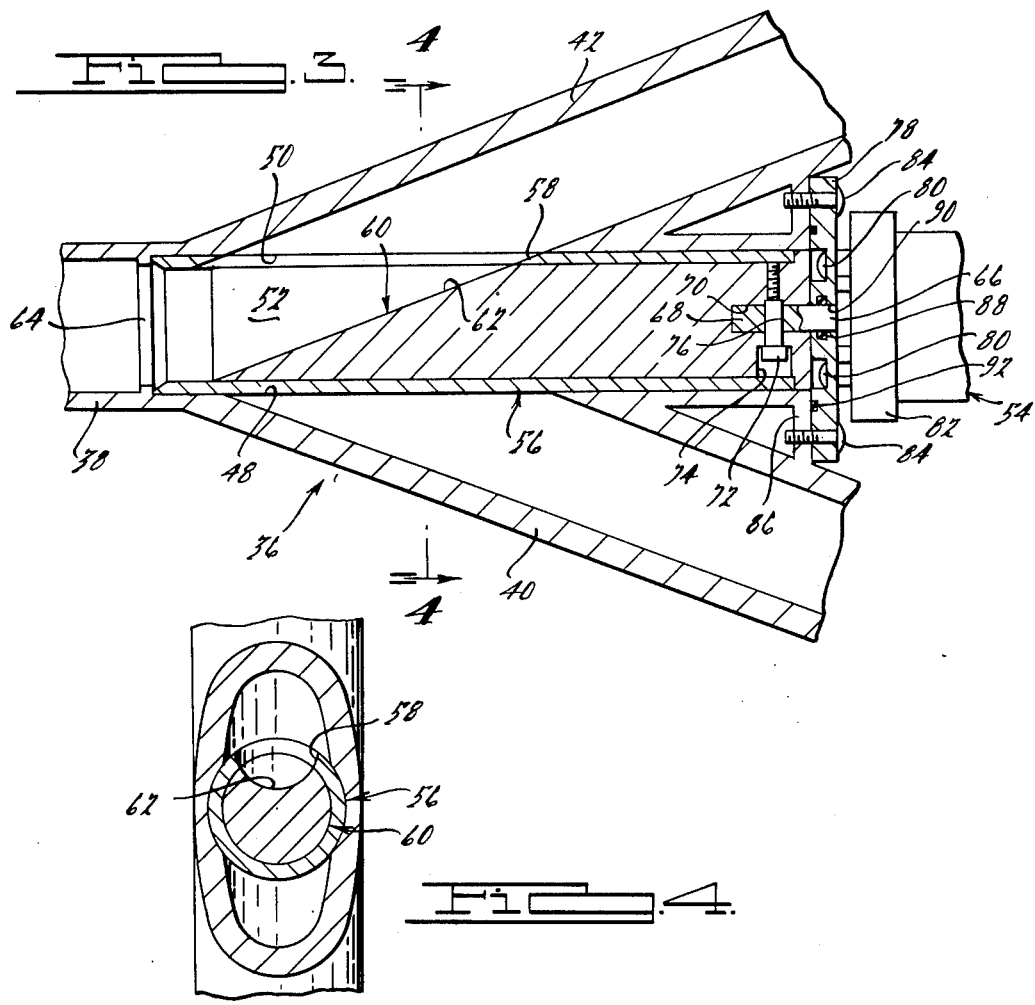

DIVERTER VALVE ASSEMBLY AND PRIORITY CONTROL CIRCUIT FOR ICE DISTRIBUTION SYSTEMS

This application is a continuation-in-part of application Ser. No. 691,355 filed June 1, 1976, now U.S. Pat. No. 4,055,280.

SUMMARY OF THE INVENTION

This invention relates generally to ice making and distributing systems and particularly, to a new and improved ice diverting valve for use with ice distribution system having an ice source, such as an ice-making machine, and two or more remotely located ice delivery or dispensing stations. Specifically, the present invention is designed to be operated with an ice making and distributing system such as is shown in U.S. patent application Ser. No. 622,151, filed Oct. 14, 1975, for Ice Transport and Dispensing System.

U.S. Pat. No. 3,580,416 discloses an ice distribution system wherein ice in cube or other form is delivered through a conduit to remotely located dispensing or storage stations by means of a high velocity flow of air. In such systems, it is desirable to provide some type of diverting valve whereby ice and the associated conveying fluid may be selectively directed or diverted to two or more remotely located dispensing or storing stations, depending upon the quantity of ice contained in the respective ice reservoirs thereof, whereby to obviate the need for completely separate or independent conveying conduits between each of the remotely located stations and the associated icemaking machine. The present invention is directed toward such a diverter valve and it is accordingly a general object of the present invention to provide a new and improved diverter valve assembly which may be used in the aforesaid type of ice distribution and/or delivery systems.

It is a more particular object of the present invention to provide a new and improved diverter valve assembly that is extremely economical to manufacture and simple to operate, and which minimizes to the extreme, any pressure drop of a conveying fluid as the ice is being transferred through the valve assembly.

It is another object of the present invention to provide a new and improved diverter valve, as above described, which requires no special or separate drain for ice melt water.

It is still a further object of the present invention to provide a new and improved diverter valve assembly of the above described type that includes control means which assures that the valve assembly is purged of all ice therein preparatory to actuation thereof.

It is a further object of the present invention to provide a new and improved diverter valve assembly wherein the direction of ice movement is selected so as to minimize any drop in the velocity of the ice being communicated therethrough, and which permits convenient assembly of the component parts of the valve assembly.

It is still another object of the present invention to provide a new and improved diverter valve assembly that can be manufactured with readily available materials and which satisfies the sanitary requirements which are imposed by Federal, State and local municipalities with regard to the handling of ice for use in beverages, etc.

Other objects and advantages of the present invention will become apparent from the following detailed description taken in conjunction with the accompanying drawings.

BRIEF DESCRIPTION OF THE DRAWINGS

FIG. 3 is an enlarged cross-sectional view of the diverter valve body and valve element incorporated in the present invention;

FIG. 4 is a fragmentary transverse cross-sectional view taken substantially on line 4—4 of FIG. 3.

FIG. 5 is a schematic representation of the electrical control circuitry incorporated in the valve assembly of the present invention;

DETAILED DESCRIPTION OF A PREFERRED EMBODIMENT

Figure 1:
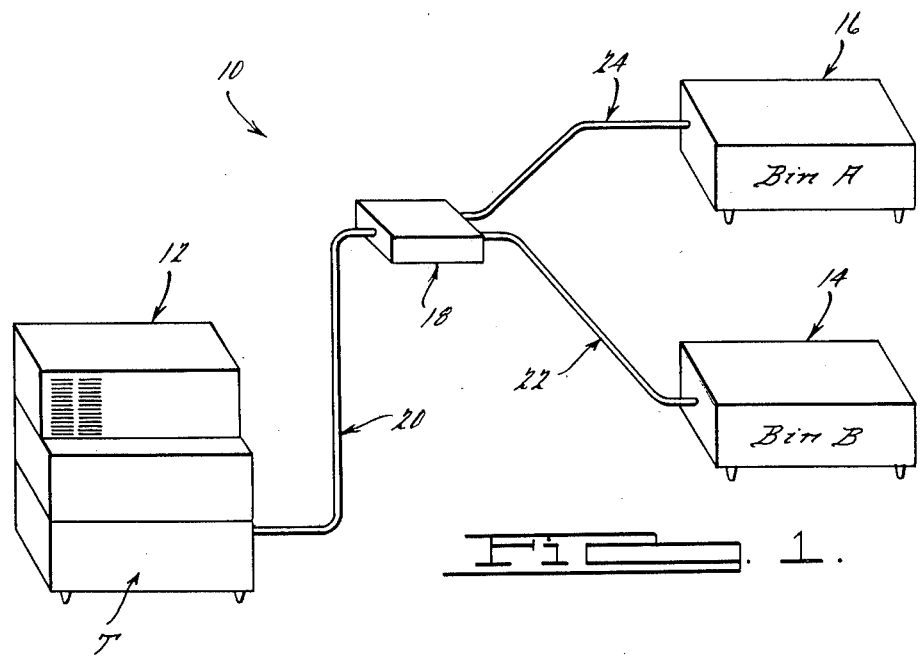
FIG. 1 is a schematic representation of an ice making and distributing system incorporating the diverter valve assembly of the present invention therein.

Referring now in detail to the drawings and in particular to FIG. 1 thereof, ice dispensing system 10 is shown as comprising ice-making machine 12, an ice transport machine T, and a pair of remotely located ice storage and/or dispensing enclosures or stations 14 and 16 having ice bins A and B, respectively. In accordance with the present invention, the system 10 is provided with an ice distributing or diverting assembly 18 which is communicable via an inlet conduit 20 with the ice transport machine T and via a pair of outlet conduits 22 and 24 with the enclosures 14 and 16, respectively. Generally speaking, the ice-making machine 10 is intended to produce ice in cube or other form, and the ice transport machine T functions to transfer such ice throubh the conduits 20, 22 and 24 to the remotely located enclosures or stations 14 and 16. The ice transport machine T may, by way of example, be of the type shown and described in the previously identified patent application and patent which are owned by the assignee hereof. The enclosures 14, 16 may merely consist of insulated ice storage containers, or alternatively, they may include some type of dispensing means by which controlled quantities of ice may be dispensed into containers, such as drinking glasses or the like. The diverting assembly 18 is intended to selectively control the flow of ice from the conduit 20 to the respective enclosures 14, 16 in accordance with the ice levels therein. For example, if the ice level in the enclosure 14 drops below some predetermined level, a control signal will be produced by a suitable ice level sensing mechanism and be transmitted to the ice-transport machine T. Receipt of such a signal by the machine T will result in ice being communicated through the conduit 20 to the ice distributing or diverting assembly 18 from where such ice will be communicated through the conduit 22 to the enclosure 14. Conversely, if the ice level within the enclosure 16 drops below some predetermined level or magnitude, the assembly 18 will be suitably actuated whereby ice being transmitted from the transport machine T and conduit 20 will be routed via the conduit 24 to the enclosure 16, as opposed to through the conduit 22 to the enclosure 14, as will hereinafter be described in detail.

Figure 2:
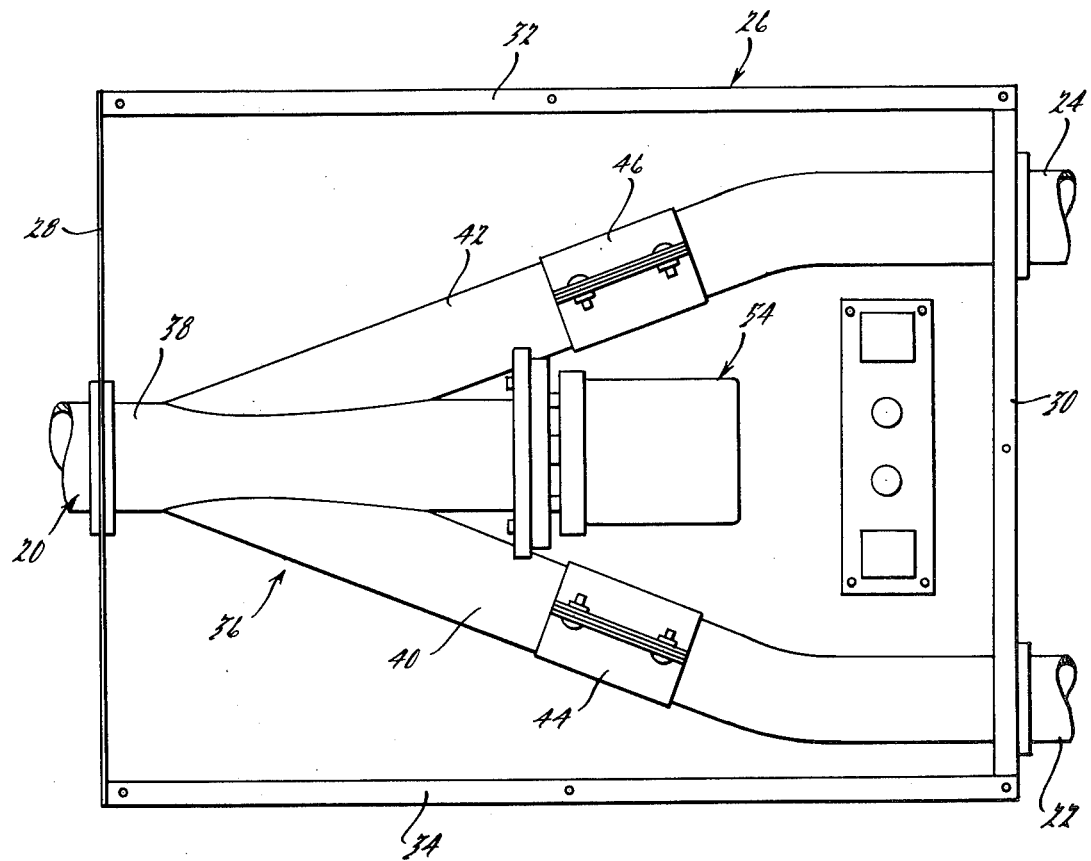
FIG. 2 is a top elevational view of the diverter valve of the present invention, as shown with the cover of the enclosure thereof removed.

The assembly 18, as best seen in FIG. 2, comprises an external housing or enclosure 26 having an inlet side 28 through which the inlet conduit 20 extends, and an outlet side 30 through which the outlet conduits 22, 24 extend. The enclosure 26 also comprises longitudinal sides 32, 34 that extend between the inlet and outlet sides 28, 30. Disposed interiorly of the enclosure 26 is an ice diverting valve, generally designated by the numeral 36, that includes an inlet section 38 which is communicable with the conduit 20 and a pair of diverging outlet sections 40, 42 respectively communicable with the conduits 22, 24. The sections 38, 40, 42 of the valve 36 are generally cylindrical or tubular shaped in transverse cross section and means in the form of a pair of suitable sleeve-like couplings 44 and 46 may be utilized for connecting the sections 40, 42 to the adjacent ends of the conduits 22, 24, as best seen in FIG. 2. A similar type coupling (not shown) may be utilized for connecting the inlet section 38 of the valve 36 to the inlet conduit 20, as will be appreciated by those skilled in the art. Preferably, the connections between the conduits 20-24 and the valve sections 38-42 are provided in a fluid and air-tight manner so as to preclude any leakage of the high velocity flow of air being transmitted thereto and/or any ice melt water which may exist in the system. As best seen in FIG. 3, the inlet section 38 of the valve 36 is formed with a pair of diametrically opposed openings 48, 50 which are respectively communicable with the interior of outlet sections 40, 42 of the valve 36.

Disposed interiorly of the inlet section 38 is a rotatable valve element, generally designated by the numeral 52, which is adapted to function in selectively controlling the flow of ice from the inlet section 38 to either the outlet section 40 or the outlet section 42, depending upon which of the ice storage and/or dispensing enclosures 14 or 16 is calling for the delivery of ice. The valve element 52 is adapted to be selectively actuated or rotated by means of an electrically energized motor, generally designated by the numeral 54, which is mounted at the opposite end of the inlet section 38 from the end thereof which is connected to the inlet conduit 20, as best seen in FIGS. 2 and 3. The valve element 52 comprises an elongated tubular member 56 having an outer diameter which is slightly smaller than the inner diameter of the valve section 38 and is adapted to be rotatable therein. The tubular member 56 is formed with an elongated opening 58 in one side thereof and is provided with an interior plug member 60 which is formed with an inclined face 62 that extends from the "downstream" edge of the opening 58 to the diametrically opposite side of the tubular member 56 adjacent to the end thereof which confronts the inlet section 38. The inclined face 62 is of a generally arcuate, concave configuration to provide a smooth curved surface that conforms with the general cylindrical shape of the interior of the valve sections 38, 40 and 42, as best seen in FIG. 4. The end of the rotatable valve element 52 opposite the motor 54 is adapted to bear against a radially inwardly extending shoulder 64 formed in the interior of the inlet section 38 of the valve 36. The opposite end of the valve element 52 is adapted to be operatively connected to the output shaft 66 of the motor 54 which, as best seen in FIG. 3, is arranged coaxially of the section 38 and valve element 52. The output shaft 66 comprises a terminal end portion 68 that is telescopically received within a blind bore 70 formed in the plug 60. Means in the form of a suitable diametrically extending locking bolt or the like 72 extends through cross bores 74 and 76 in the plug 60 and output shaft 66 for securing the shaft 66 and valve element 52 against relative rotational movement. The motor 54 is operatively mounted on a suitable mounting plate 78 by means of screws, bolts, or the like 80, which screws 80 are threadably received within the suitable internally threaded bores in the motor housing 82. The mounting plate 78 is in turn secured by means of suitable screws, bolts, or the like 84 to a radially disposed mounting flange 86 which extends radially outwardly from the central section 38 of the valve 36 between the sections 40, 42 thereof. Means in the form of a suitable O-ring seal 88 is provided interjacent to the outer periphery of the motor output shaft 66 and the inner periphery of a bore 90 formed in the mounting plate 78 through which the shaft 66 extends. A similar O-ring sealing element 92 is provided between the mounting plate 78 and the mounting flange 86, the seals 88, 92 functioning to prevent fluid leakage or the like out of the diverting valve 36. It should be noted that the sections 38, 40 and 42 of the valve 36 may comprise sections of conduit fabricated of a suitable molded plastic material, such as polyvinylchloride (PVC) which are suitably formed and joined at the intersections of the sections 38, 40 and 42. Alternatively, the sections 38, 40 and 42 may be of a one-piece molded construction, depending upon the desired manufacturing techniques. Similarly, the valve element comprising the tubular member 56 and plug 60 may be fabricated in a one-piece manner instead of utilizing separate components 56 and 60, as described herein.

Referring now in detail to the construction and operation of the electrical control circuit of the assembly 18 of the present invention, as illustrated in FIG. 5, an exemplary electrical control system is shown which is adapted to be energized by means of a suitable source of 110 Volt A. C. power, generally designated by the numeral 102. The electrical control circuit includes a pair of primary conductors 104 and 106, the former of which is communicable with conductors 107 and 108 that are respectively communicable with a pair of motor relays 110 and 112 and conductors 114 and 116 to a cam operated switch 118. The switch 118 is in turn connected to one terminal of the motor 54, the other terminal of which is connected with the primary conductor 106, as illustrated. The cam operated switch 118 may be of any suitable single pole, double throw construction and is adapted to effect deenergization of the motor 54 after the same has rotated the valve element 60 180° from its position diverting ice to the outlet section 42, for example, to the outlet section 40. By way of example, the cam switch 118 may be operated by a cam having a pair of diametrically opposed lobes or eccentric portions which are adapted to be engaged by a suitable cam follower for opening and closing the switch armature (not shown). The motor 54 preferably operates such that the drive shaft thereof moves or rotates continuously in a single direction in response to operation of the cam switch 118; however, it is contemplated that the motor 54 could be of the reversible type and reverse the direction of rotation of the output shaft 66 in response to operation of the cam switch 118, as will be appreciated by those skilled in the art.

The electrical control circuit which is shown in FIG. 5 is communicable with two remotely located bins, generally designated as bin A and bin B. Additionally, the control circuit is communicable with an associated source of ice, such as the ice transport machine T hereinabove referred to. The control circuit is preferably operable by a control signal voltage of 24 Volts A.C. and includes a 24 Volt power conductor 120 and with a 24 Volt neutral conductor 122. A signal conductor 124 from bin A is communicable with conductor 126 which is in turn connected to terminals 128 and 130 of relay 112. The contacts 128 and 130 are normally closed and complete a circuit to a time delay circuit, generally designated by the numeral 131. The circuit 131 includes a heater coil 132, time delay contacts 134 and 136 and coil 138 of the relay 110. Conductor 126 is also communicable with contacts 140, 142 of relay 110, which contact 140, 142 are normally open and communicate via conductor 144 with the associated ice transport machine, such as is shown in the aforementioned pending patent application. Conductor 144 is also communicable via normally open contacts 146 and 148 with conductor 150 from bin B. Conductor 150 from bin B is also connected via conductor 152 via normally closed relay contacts 154 and 156 with a second time delay circuit, generally designated by the numeral 158. The circuit 158 is similar to the aforementioned circuit 131 and includes the coil 160 of relay 112, a heater element 162 and time delay relay contacts 164 and 166. Bins A and B are connected via conductors 120 and 168, and bin B is connected via conductors 170 and 171 with the ice transport machine T, as illustrated.

Referring now in detail to a typical operational cycle of the above described electrical control circuit, assuming that the various relay contacts are in their respective positions shown in FIG. 5, and assuming that bin A is calling for ice, a control signal is produced at bin A and is communicable via conductor 124 and normally closed contacts 128 and 130 of relay 112 to the time delay circuit 131. When this signal is received by the circuit 131, the heater coil 132 thereof will be energized, and after the heater has been energized for a predetermined length of time, the normally open time delay relay contacts 134 and 136 will close. Upon closing of the contacts 134, 136, a circuit is completed to relay coil 138 which in turn causes relay 110 to close and a circuit being completed to the motor 54. As previously mentioned, upon energization of the motor 54, the diverter valve will rotate toward a position diverting ice to bin A, and this circuit will remain closed until the signal device at bin A opens, resulting in the relay coil 128 dropping out and contacts 140, 142 opening. At this time, contacts 154, 156 return to their normally closed position. When the cam switch 118 opens, the diverter valve will be properly positioned to divert ice toward bin A. It is to be noted that when relay 110 closes, a circuit is completed with the ice transport machine through the contacts 140 and 142 of relay 110, with the result that the ice transport machine is energized and ice is delivered to bin A through the diverter valve and associated conduit system.

As such time as bin A has been supplied with a predetermined amount of ice, and the thermostatic or signal device therin so indicates, the control signal to the transport machine T will cause this machine to be deenergized; however, the diverter valve will remain in the position diverting ice to bin A until such time as a signal is received from bin B indicating that ice is to be supplied to bin B. When the signal from bin B is received at the diverter valve control circuit calling for ice to be delivered to bin B, such signal passes through the closed contacts 154, 156 of relay 110 to the time delay circuit 158. Such signal effects energization of the heater 162 for a predetermined period of time, after which the normally open contacts 164, 166 close completing a circuit to the relay coil 160 of the relay 112. When this occurs, current is supplied via the closed relay 112 to the motor 54 which results in energization of the motor 54 causing the diverter valve to be rotated to the position diverting ice to bin B. As such time as bin B becomes full of ice and the thermostat or signal device therein is satisfied, the diverter valve remains in the position for diverting ice to bin B until such time as a signal from bin A is received. It is to be noted that each bin signal must pass through normally closed contacts of the other relays i.e., relays 110 or 112, whereby to assure that only one bin can signal at a time. It is also to be noted that the use of the time delay circuits 131 and 158 assures that no ice is transported to either bin A or to bin B while the diverter valve is rotating from one position to the other position. Moreover, even though the ice transport machine T and diverter valve are energized at the same time when either bin A or bin B calls for ice, because the transport machine T is disposed at a substantially remote location relative to the diverter valve, the diverter valve, which rotates at approximately one-half rpm, will be repositioned before such time as the ice originating from the transport machine T reaches the diverter valve. Hence, no damage can occur to the diverter valve by ice being communicated therethrough while the valve element is being repositioned to communicate ice from bin A to bin B or vice versa.

Figure 6:
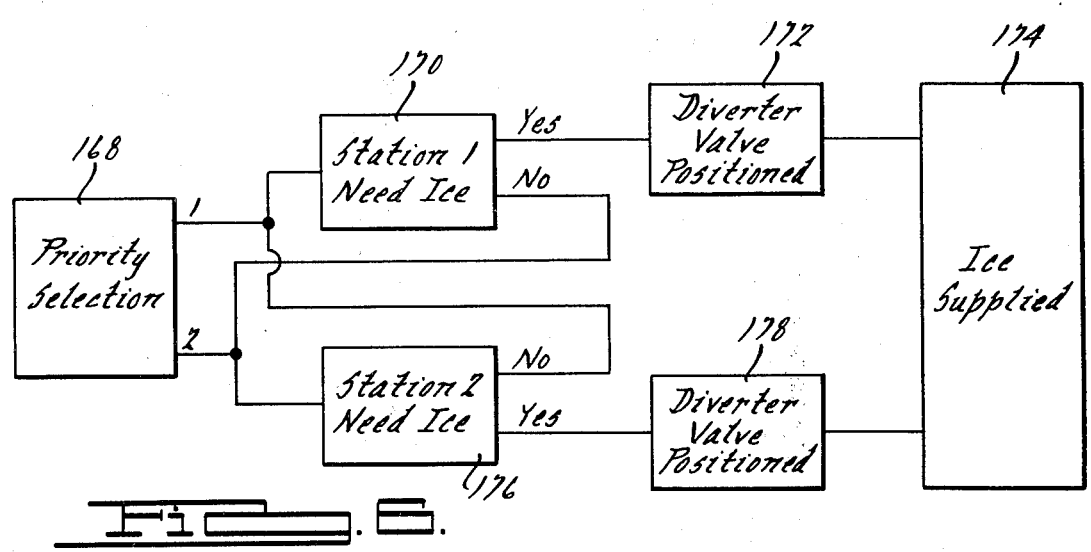
FIG. 6 is a block logic diagram illustrating the operation of the priority control circuit.
Figure 7:
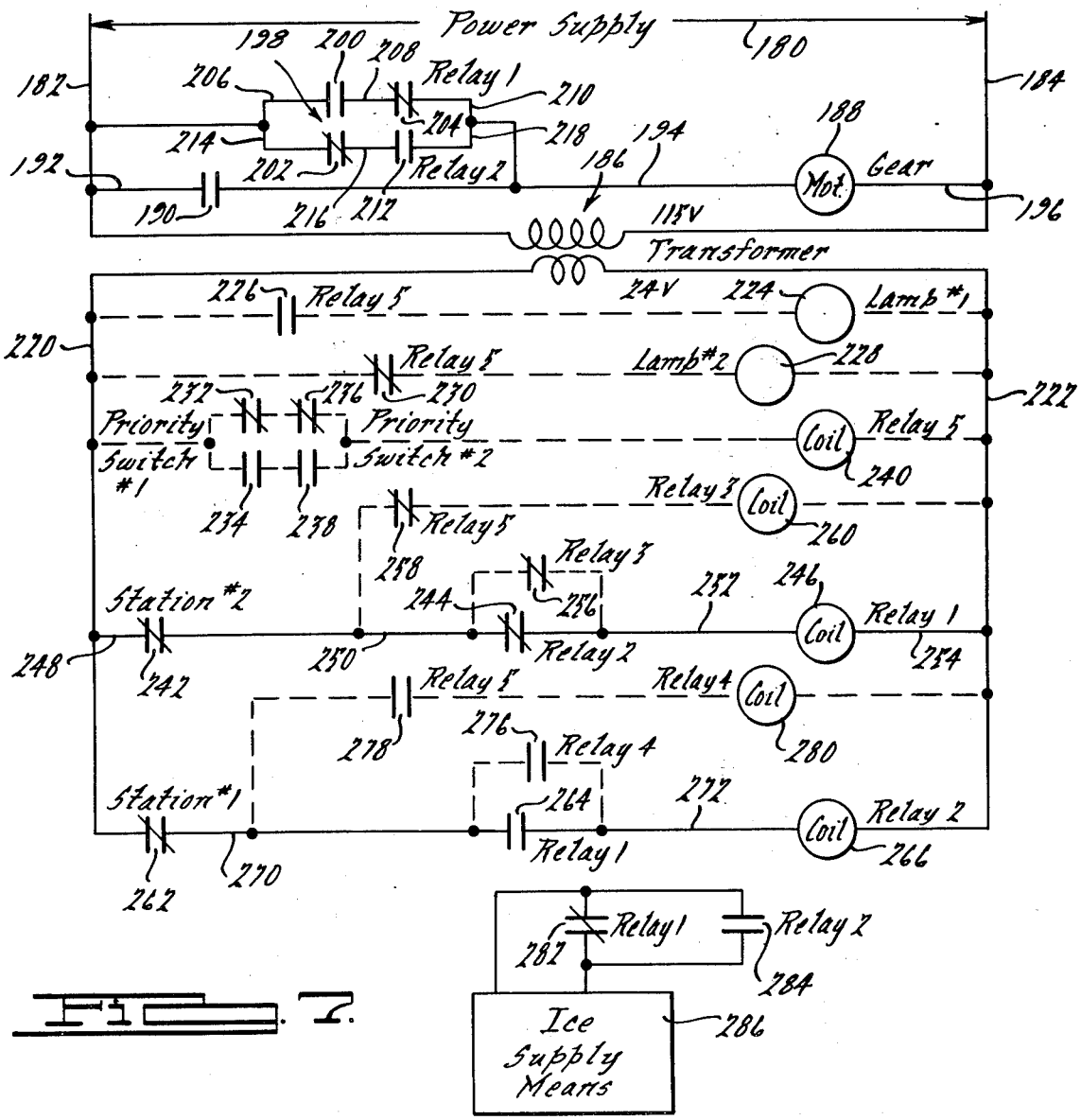
FIG. 7 is a schematic diagram of the priority control circuit.

Referring now to FIGS. 6 and 7, there is illustrated a logic diagram and associated exemplary circuit for providing a priority control to the ice distribution system of the present invention. The priority system includes priority selections means 168 for selecting a station to be given a priority supply or be filled with ice before any other station is supplied with ice without regard to the ice level of such other stations. Assume for purposes of explanation that priority selection means 168 is set for station 1. Station 1 is equipped with signaling means 170 to sense and signal the need for ice. If signaling means 170 indicates a need for ice at station 1, diverter valve positioning circuit means 172 then verifies that the diverter valve is properly positioned to direct ice to station 1 and thereafter activates ice supplier 174. In the event station 1 does not need ice, but station 2 signaling means 176 indicates a need for ice at station 2, diverter valve positioning circuit means 178 verifies that the diverter valve is properly positioned for supply and actuates ice supply means 174. Similarly, if priority selection 168 is set for station 2, signal means 176 will indicate either a need for ice at station 2 which if required will be supplied in like manner as described above before any supply is provided to station 1.

Referring now to FIG. 7, a schematic diagram of an exemplary and preferred circuit for accomplishing the priority control is illustrated and will be described. A power supply 180 is provided via conductors 182 and 184 which supplies transformer 186. A motor 188 is connected in series with a first cam switch 190 across conductors 182 and 184 via conductors 192, 194, and 196. A second cam switch 198 is also provided comprising switches switches 200 and 202. Switch 200 is connected in series with contact 204, of a relay 1 via conductors 206, 208, and 210 and switch 202 is connected in series with contacts 212 of another relay 2 via conductors 214, 216, 218. Conductors 206 and 214 are each connected to conductor 182 and conductors 210 and 218 are each connected to conductor 194 thereby placing switches 200 and relay contacts 204 in parallel with switch 202 and contacts 212 both of which are then in parallel with cam switch 190.

Preferably power supply 180 will be convention 110 Volt 60 Cycle single phase A. C. which motor 188 will be adapted to operate on. Transformer 186 will be suitable to provide 24 Volt A. C. current to the priority control circuitry described below via conductors 220 and 222.

A first indicator lamp 224 is connected in series with relay contacts 226 of another relay 5 between conductors 220 and 222 and a second indicator lamp 228 is connected in series with contacts 230 of relay 5. Preferably respective indicator lamps 224 and 228 will be positioned at respective distribution stations 1 and 2 and will be selectively illuminated so as to indicate which station is on priority distribution status. However, these or additional indicator lamps may also be positioned on a central control panel if desired. Further, additional indicator lamps may be provided should additional distribution stations be incorporated into the system.

Priority switch 1 comprises contacts 232, 234 which are each connected in series with respective ones of contacts 236, 238 comprising priority switch 2 and the two series circuits are connected in parallel with each other. Relay 5 actuating coil 240 is connected in series with this parallel circuit comprising switches 232, 234, 236, and 238 all of which is connected between conductors 220 and 222.

A suitable sensor controlled switch 242 is connected between conductors 220 and 222 in series with contacts 244 of Relay 2 and actuating coil 246 of relay 1 via conductors 248, 250, 252, and 254. Relay contacts 256 of relay 3 are connected in parallel with relay contacts 244 of relay 2. Relay contacts 258 of relay 5 are connected in series with relay 3 actuating coil 260 between conductors 250 and 222. Sensor controlled switch 242 is preferably connected to suitable sensor means located at station 1 which sensor means are adapted to provide an actuating signal indicating a need for ice at that station thereby closing switch 242.

Similarly another sensor controlled switch 262 is connected between conductors 220 and 222 in series with contacts 264 of relay 1 and actuating coil 266 of relay 2 via conductors 270 and 272. Relay contacts 276 of relay 4 are connected in parallel with relay contacts 264 of relay 1. Relay contacts 278 of relay 5 are connected in series with actuating coil 280 of relay 4 between conductors 270 and 222.

Additional contacts 282 of relay 1 and 284 of relay 2 are connected in parallel and operate to control actuation of ice supply means 286.

As this schematic diagram is illustrated with the priority selection positioned for supplying ice to station 2 with both stations calling for ice and therefore the operation thereof will be first described in this operational mode. When either contacts 232 and 236 or 234 and 238 are in a closed position priority will be given to supply ice to station 2. As illustrated current will flow through contacts 232, 236 and relay actuating coil 240 of relay 5 thereby causing normally open contacts 230, 258 to close and normally closed contacts 226, 278 to open. Closing of relay 5 contacts 230 will complete the circuit through lamp 238 causing illumination thereof thereby indicating that station 2 is now on priority status while opening of contacts 226 extinguishes lamp 224. Opening of contacts 278 will deactivate relay 4 actuating coil 280 thereby allowing contacts 276 to open. As station 2 sensor controlled switch 242 is closed due to the sensed condition of ice required a circuit is completed between conductors 220 and 222 through conductors 248 and 250, switch 242, relay contacts 258 and relay 3 actuating coil 260. Relay 3 actuating coil 260 will thus cause normally open contacts 256 to close thereby completing the circuit between conductors 250, 252 and through relay 1 actuating coil 246. Actuating coil 246 will thus cause normally open contacts 204 and 282 to close and normally closed contacts 264 to open. Opening of contacts 264 will thus prevent completion of a circuit between conductors 220 and 222 through station 1 sensor controlled switch 262 thus preventing distribution of ice to this station regardless of the status of switch 262.

Switches 190, 200, and 202 are cam operated switches which operate to control actuation of motor 188 thereby controlling the position of the diverter valve. Preferably cam switch 198 comprising switches 200 and 202 will be in the form of a single pole double through switch operated by a single cam having lobes or eccentrics designated to close switch 202 and open switch 200 when the diverter valve is positioned to distribute ice to station 2 and to close switch 200 and open switch 202 when diverter valve is positioned to distribute ice to station 1. Thus as switch 200 is open and switch 202 is closed, diverter valve is positioned for distribution to station 2 and closing of contacts 204 has no effect. However, assuming switch 200 were closed (switch 202 thus being open) the diverter valve would be in position for distribution to station 1 and therefore closing of contacts 204 would complete a circuit through motor 188 thereby causing diverter valve to begin moving to station 2 distribution position. Preferably the cam operating switches 200 and 202 will be designed to open switch 200 and close switch 202 before reaching station 2 distribution position.

Cam switch 190 will be operated by a cam having lobes or eccentrics designed to maintain switch in a closed position at all times except when diverter valve is precisely positioned for distribution to either station 1 or station 2. This therefore enables greater latitude in design of the lobes of the cam operating switches 200 and 202 as switch 190 will insure complete repositioning of the diverter valve once movement thereof has been started as well as insuring proper positioning of the diverter valve.

As previously mentioned actuation of relay actuating coil 246 will cause normally open contacts 282 to close and thereby begin operation of the ice supply means 286.

Once station 2 has been sufficiently supplied with ice, sensor controlled switch 242 will open thereby deactivating relay 1 actuating coil 246 and relay 3 actuating coil 260. As relay 1 is deactivated contacts 204 and 282 will return to their normally open positions thereby stopping operations of ice supply means 286 and contacts 264 will return to its normally closed position thereby completing a circuit through switch 262 and relay 2 actuating coil 266. Actuating coil 266 will thereupon close normally open contacts 212 and 284. As diverter valve is in station 2 distribution position, switch 202 is in a closed position, thus closing of relay 2 contacts 212 completes a circuit through motor 188 causing diverter valve to move to station 1 distribution position. Closing of contacts 284 will begin operation of ice supply means 286.

It should be noted that as relay 5 actuating coil is still activated, contacts 278 are in an open position thus preventing actuation of relay 4 actuating coil 280 which in turn prevents closure of contacts 276. Therefore should sensor controlled switch 242 close indicated station 2 requires ice before station 1 has been satisfied relay 1 actuation coil 246 will be actuated opening contacts 264, deactivating relay 2 actuating coil which thereby opens contacts 212 and 284, and closing contacts 204 and 282 thereby establishing the priority status of station 2.

Priority status may be afforded station 1 by opening either switch 232 and closing corresponding switch 234 or opening switch 236 and closing corresponding switch 238. As priority switch 1 and priority switch 2 will preferably be located at their respective remote stations this arrangement provides means by which the priority status may be switched from either station to the other from either location. Preferably both priority switches 1 and 2 comprising switches 232, 234 and 236, 238 will be of a single pole double throw type.

It should be noted that while the above circuit is illustrated and described herein as providing means for establishing priority control between 2 stations the concepts involved therein are not so limited but may be expanded to cover additional stations.

While it will be apparent that the preferred embodiment of the invention disclosed is well calculated to fulfill the objects above stated, it will be appreciated that the invention is susceptible to modification, variation and change without departing frodm the proper scope or fair meaning of the subjoined claims.

We claim:

1. A priority control system for a multi-station material distribution system comprising:
    a diverter valve assembly for selectively communicating material between a first conduit and a second or third conduit,
    material supply means for supplying material to said diverter valve assembly via said first conduit,
    a first material distribution station for receiving material via said second conduit,
    a second material distribution station for receiving material via said third conduit,
    first and second sensing means for sensing the quantity of said material in respective of said first and second stations and generating a signal in response to a predetermined quantity,
    priority control means for receiving said signals from said first and second sensing means, actuating said material supply means and said diverter valve assembly so as to distribute said material to a selected one of said first and second stations in response to receipt of said signal without regard to the presence of said signal from another of said first and second stations,
    said priority control means including priority selection circuit means, station one distribution priority circuit means, and station two distribution priority circuit means, said priority selection circuit means being operable to selectively allow actuation of station one or station two distribution priority circuit means in response to receipt of said signal by the corresponding distribution priority circuit means.

2. The invention as set forth in claim 1 wherein each of said station one and station two distribution priority circuit means includes means for positioning said diverter valve assembly.

3. The invention as set forth in claim 1 wherein said diverter valve assembly includes motor drive means for varying the position of said diverter valve and said station one distribution priority circuit means is operable to actuate said motor drive means to position said diverter valve for distribution to said first material distribution station.

4. The invention as set forth in claim 1 wherein said station one distribution priority circuit means includes disabling means to prevent actuation of station two distribution priority circuit means when said signal is received from said second sensor.

5. The invention as set forth in claim 4 wherein said station one distribution priority circuit means includes circuit means for allowing distribution of material to said station two upon cessation of said signal to said station one.

6. The invention as set forth in claim 1 wherein said priority selection circuit means includes first and second switch means each being switchable between a first and second position, switching of either of said first and second switches being operable to change priority status from one station to another.

7. The invention as set forth in claim 6 further comprising station one and station two indicator lamps, said first indicator lamp and said first switch means being remotely located from said station one and station two distribution priority circuit means.

8. The invention as set forth in claim 6 wherein said priority selection circuit means further includes a first relay actuating coil operable to control the position of a plurality of contacts for illuminating a selected one of a first and second indicator lamps and actuating a selected one of a second and third relay actuating coils thereby actuating a selected one of said first and second distribution priority circuit means.

9. The invention as set forth in claim 8 wherein said second relay actuating coil is connected in said station one distribution priority circuit and is operable to control the position of at least one set of contacts which contacts are operable to allow actuation of a fourth relay actuating coil.

10. The invention as set forth in claim 9 wherein said fourth relay actuating coil is operable to control the position of a plurality of contacts, said fourth relay controlled contacts being operable to selectively vary the position of said diverter valve assembly and to activate said material supply means.

11. The invention as set forth in claim 9 wherein said fourth relay actuating coil is operable to vary the position of a set of contacts disposed in said station two distribution priority circuit means and cooperating with one of said plurality of first relay actuating coil controlled contacts to disable said station two distribution priority circuit means.

* * * * *